United States Patent
Okada (10) Patent No.: US 7,782,368 B2
(45) Date of Patent: Aug. 24, 2010

(54) IMAGE SIGNAL PROCESSING UNIT FOR AMPLIFYING SIGNAL LEVEL OF EFFECTIVE PIXEL REGION AND METHOD

(75) Inventor: Koji Okada, Kasugai (JP)

(73) Assignee: Fujitsu Semiconductor Limited, Yokohama (JP)

(*) Notice: Subject to any disclaimer, the term of this patent is extended or adjusted under 35 U.S.C. 154(b) by 853 days.

(21) Appl. No.: 11/212,763

(22) Filed: Aug. 29, 2005

(65) Prior Publication Data

US 2006/0268358 A1 Nov. 30, 2006

(30) Foreign Application Priority Data

May 30, 2005 (JP) .............................. 2005-157380

(51) Int. Cl.
  *H04N 5/235* (2006.01)
(52) U.S. Cl. .................... 348/229.1; 348/241; 348/243; 348/222.1
(58) Field of Classification Search ............. 348/229.1, 348/301, 251, 300, 273–283, 241; 358/448
See application file for complete search history.

(56) References Cited

U.S. PATENT DOCUMENTS

| 7,123,301 | B1 * | 10/2006 | Nakamura et al. ........... 348/301 |
| 2004/0252204 | A1 * | 12/2004 | Kurane .................... 348/222.1 |

FOREIGN PATENT DOCUMENTS

| JP | 2001-28716 A | 1/2001 |
| JP | 2002-209222 A | 7/2002 |
| JP | 2003-298953 A | 10/2003 |
| JP | 2004-208240 A | 7/2004 |
| KR | 1994-25306 | 11/1994 |

OTHER PUBLICATIONS

Machine translation of JP 2004/208240; Jul. 2004; Tai, Koji.*
Japanese Office Action mailed Jun. 8, 2010 by the Japanese Patent Office for Japanese Patent Application No. 2005-157380. A partial English-language translation is provided.

* cited by examiner

*Primary Examiner*—David L Ometz
*Assistant Examiner*—Antoinette T Spinks
(74) *Attorney, Agent, or Firm*—Fujitsu Patent Center (57) ABSTRACT

The first amplifier sets a first amplification factor for the pixel signals for each color pixel to adjust the sensitivities of the color pixels. The second amplifier amplifies the pixel signals, whose sensitivities have been adjusted, with a second amplification factor. The second amplification factor allows the color level signal having the maximum signal intensity in the pixel signals which have been adjusted in sensitivity and output from the first amplifier to have a signal intensity equivalent to the dynamic range of image processing performed in a latter stage. The computing unit subtracts a black level signal component from each of the pixel signals amplified by the second amplifier. After adjusting the sensitivities which differ between colors, the color level signals can be amplified up to the dynamic range of the image processing.

15 Claims, 6 Drawing Sheets

CIRCUIT BLOCK DIAGRAM OF IMAGE SIGNAL PROCESSING UNIT ACCORDING TO EMBODIMENT

FIG. 1

CONCEPTUAL DIAGRAM SHOWING PIXEL ARRAY OF IMAGE DEVICE

FIG. 2  DIAGRAM SHOWING OUTPUT SIGNAL OF IMAGE DEVICE

FIG. 3 CIRCUIT BLOCK DIAGRAM OF IMAGE SIGNAL PROCESSING UNIT ACCORDING TO EMBODIMENT

FIG. 4

CONCEPTUAL DIAGRAM SHOWING SENSITIVITY ADJUSTMENT MADE BY FIRST AMPLIFIER (CDSamp)

FIG. 5
CONCEPTUAL DIAGRAM SHOWING PROCESSING PERFORMED BY
SECOND AMPLIFIER (PGA) AND COMPUTING UNIT

FIG. 6
FLOWCHART OF EMBODIMENT

IMAGE SIGNAL PROCESSING UNIT FOR AMPLIFYING SIGNAL LEVEL OF EFFECTIVE PIXEL REGION AND METHOD

CROSS-REFERENCE TO RELATED APPLICATIONS

This application is based upon and claims the benefit of priority from each of the prior Japanese Patent Application No. 2005-157380 filed on May 30, 2005, the entire contents of which are incorporated herein by reference.

BACKGROUND OF THE INVENTION

1. Field of the Invention

The present invention relates to an image signal processing unit and more particularly to amplification of the signal level of an effective pixel region.

2. Description of Related Art

Japanese Published Unexamined Patent Application No. 2001-28716 discloses a technique including a pixel signal gain amplification (P×GA) circuit. When amplifying pixel signals output from a CCD, pixel signals having variations in amplitude are input to a correlated double sampling (CDS) circuit and then transferred from the CDS circuit to the P×GA circuit. In the P×GA circuit, the pixel signals are individually amplified according to colors with a variably-settable gain to uniform the levels of the pixel signals. These signals are further amplified by a variable gain amplifier, so that amplified pixel signals including amplified noise are obtained.

SUMMARY OF THE INVENTION

Herein, the pixel signals output from the pixels which constitute an image device such as CCD through a CDS circuit are signals having a color level signal on which a black level signal is superimposed. The black level signal is a signal output even in a light-shielded condition and mainly caused by dark current flowing as leak current. The leak current such as dark current is generated depending on the temperature of the image device, device configuration, manufacturing variations, etc. and flows irrespective of pixels. Therefore, the pixel signals output from the CDS circuit include the black level signal that is a noise component and superimposed on the color level signal indicative of effective picture information.

In the patent publication No. 2001-28716, each of the pixel signals output from the CDS circuit is amplified in the P×GA circuit and the variable gain amplifier and at that time, the color level signal and the black level signal are simultaneously amplified. Therefore, even though the amplified pixel signal seemingly has a signal level which corresponds to the limit of the dynamic range of an AD converter located in a latter stage, the black level signal, that is, an amplified noise component is contained in this pixel signal. Since the color level signal which is effective as picture information cannot be amplified to the limit of the dynamic range of the AD converter, there arises a possibility that the resolution of the picture information to be transmitted may decrease. This causes such a problem that the picture information provided by the image device deteriorates.

Although the pixel signal is seemingly amplified up to the dynamic range, the black level signal i.e., a noise component is superimposed on the color level signal so that the resolution of the effective picture information is likely to deteriorate.

The invention has been made taking account of the above-described background art and therefore a primary object of the invention is to provide an image signal processing unit and an image signal processing method which can perform image processing with color level signals which make full use of the dynamic range. In the invention, pixel signals each including a black level signal superimposed on a color level signal which varies in sensitivity between colors are processed such that after the sensitivity of each color level signal is adjusted, the color level signal is amplified to the limit of the dynamic range of image processing and then, the black level signal is eliminated from each amplified pixel signal.

To achieve the purpose above, an image signal processing unit for processing pixel signals is provided by color pixels of an image device, each pixel signal including a color level signal and a black level signal superimposed on the color level signal, the processing unit comprising a first amplifier for setting a first amplification factor for the pixel signals for each color pixel to adjust the sensitivities of the color pixels, a second amplifier for amplifying the pixel signals, whose sensitivities have been adjusted, with a second amplification factor which allows the color level signal having the maximum signal intensity in the pixel signals which have been adjusted in sensitivity and output from the first amplifier to have a signal intensity equivalent to a dynamic range of image processing performed in a latter stage, and a computing unit for subtracting a black level signal component from each of the pixel signals amplified by the second amplifier.

In the image signal processing unit according to the invention, when processing pixel signals each having a color level signal on which a black level signal is superimposed, the first amplifier sets a first amplification factor for each color pixel to adjust the sensitivities of the color pixels. The second amplifier amplifies each of the pixel signals, whose sensitivities have been adjusted, with a second amplification factor. In the computing unit, a black level signal component is subtracted from each pixel signal which has been amplified by the second amplifier. By virtue of the process in which the pixel signals adjusted in sensitivity are amplified with their respective second amplification factors so that the maximum signal intensity of the color level signals becomes the signal intensity equivalent to the dynamic range, and then, the black level signal component is subtracted from each pixel signal, it becomes possible to extract color level signals which make full use of the dynamic range. In this way, the color level signal indicative of effective picture information obtained from each color pixel is amplified up to the dynamic range of image processing performed in the latter stage.

Furthermore, an image signal processing method for processing pixel signals is provided by color pixels of an image device, each pixel signal composed of a color level signal and a black level signal superimposed on the color level signal, the method comprising the steps of adjusting the sensitivities between the color pixels by individually amplifying the pixel signal of each color pixel, amplifying the pixel signals whose sensitivities have been adjusted in the sensitivity adjusting step, so that the color level signals of the pixel signals are increased up to a dynamic range of image processing performed in a latter stage, and subtracting a black level signal component from each of the pixel signals obtained in the step of amplifying the pixel signals adjusted in sensitivity.

In the image signal processing method according to the invention, when processing pixel signals having a color level signal on which a black level signal is superimposed, the pixel signals of the color pixels are individually amplified to adjust the sensitivities differing between the color pixels and then, the pixel signals, whose sensitivities have been adjusted, are amplified so that the color level signals expand up to the dynamic range of image processing performed in the latter stage, followed by subtraction of the black level signal component from each pixel signal. Thereby, color level signals having signal levels which make full use of the dynamic range can be extracted.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Referring now to FIGS. 1 to 6, an image signal processing unit and an image signal processing method will be described in detail according to a preferred embodiment of the invention.

The invention is applied to cases where image processing is performed while repeatedly obtaining picture information, when displaying moving images or still images. In the following description, a digital camera will be explained as an example of image processing units.

Figure 1:
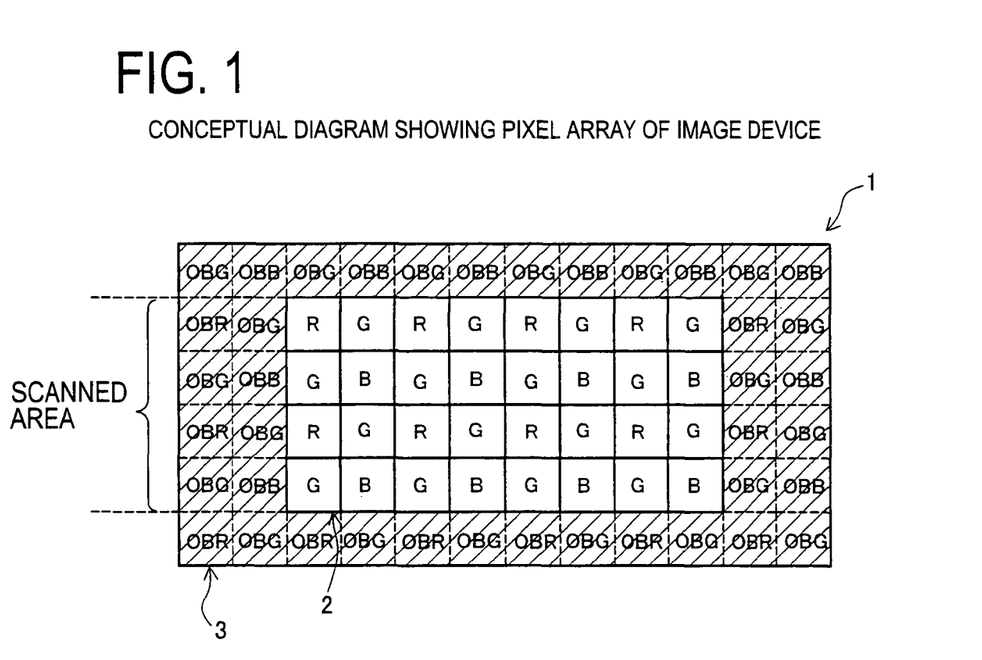
FIG. 1 is a conceptual diagram showing a pixel array of an image device.

FIG. 1 shows a conceptual diagram of one example of the pixel array of a single-panel image device 1 such as a CCD device for use in a digital camera etc. The image device 1 has pixels of three primary colors R, G, B, i.e., a red pixel R, a green pixel G and a blue pixel B to obtain picture information.

The image device 1 has an effective image region 2 in which the color pixels R, G, B for providing effective picture information are arranged. In the effective image region 2, rows in which the red and green pixels R, G are alternately arranged in a lateral direction of FIG. 1 alternate with rows in which the green and blue pixels G, B are alternately arranged in a lateral direction of FIG. 1, such that the green pixels G in the adjacent rows are not aligned in a vertical direction. This array is the so-called "bayer array".

Generally, the image device 1 has, in the periphery of the effective pixel region 2, a light-shielded region 3 which is shielded from light by a film made from e.g., argentine (Ag) or aluminum (Al). The light-shielded region 3 is called "an OB region" and also called "a black level region" because it does not allow light transmission and does not acquire picture information. Although the light-shielded region (OB region) 3 is shielded from light and generate no color level signals based on picture information, it generates black level signals which are noise components and mainly caused by dark current flowing as leak current. The leak current such as dark current is generated depending on the temperature of the image device 1, the configuration of the image device 1, manufacturing variations etc. The leak current flows in all pixels irrespective of the light-shielded region (OB region) 3 or the effective pixel region 2.

Figure 2:
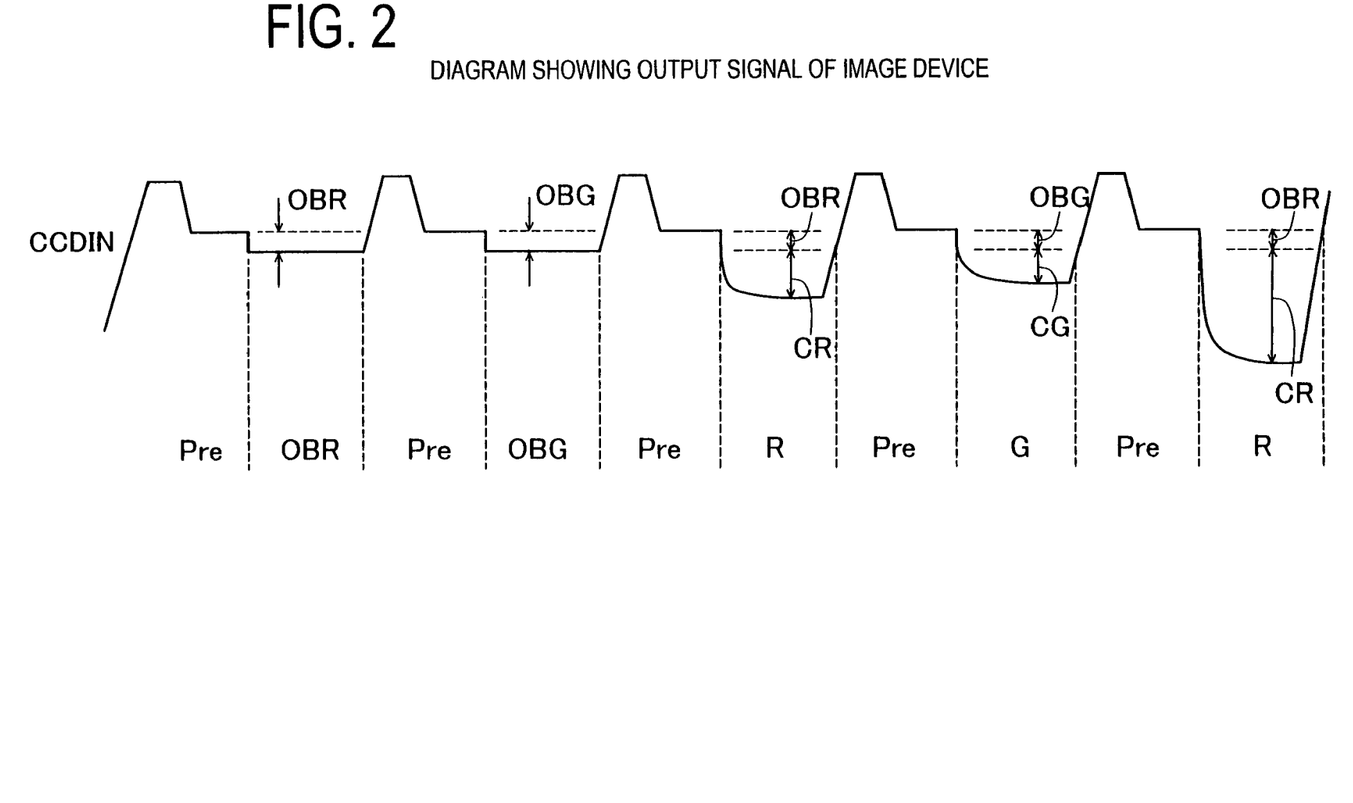
FIG. 2 is a diagram showing an output signal of the image device.

The image device 1 is laterally scanned. FIG. 2 shows a waveform of an output signal CCDIN outputted from the image device 1 during the lateral scanning of the image device 1, the waveform being associated with a row in which the red and green pixels R, G are alternately arranged. The pixels respectively generate pixel signals with a precharging period (Pre) interposed. In the first two cycles, black level signals OBR, OBG are outputted from the OB region. In the subsequent cycles, the red and green pixels R, G are alternately output in a sequential manner. Each color pixel R, G outputs a pixel signal in which a black level signal OBR or OBG (a noise component) is superimposed on a color level signal CR or CG. The signal intensities of the color level signals CR, CG differ between the color pixels R, G depending on effective picture information, whereas the signal intensities of the black level signals OBR, OBG do not differ between the color pixels R, G. To obtain accurate picture information, it is necessary to eliminate the black level signal OBR, OBG or OBB from the pixel signal generated by each color pixel R, G or B on condition that the color level signal CR, CG or CB is not affected.

Insignificantly, though, the signal intensities of the black level signals OBR, OBG, OBB of the color pixels R, G, B may differ from each other for the reason that the black level signals are mainly originated from leak current such as dark current which may be dependent upon device properties. Therefore, when eliminating the black level signals OBR, OBG, OBB from their associated pixel signals, it is preferable to estimate the black level signal for each of the color pixels R, G, B. The pixels are arranged in the light-shielded region (OB region) 3 in accordance with the arrangement of the pixels in the rows of the effective pixel region 2, thereby obtaining the black level signals OBR, OBG, OBB of the color pixels R, G, B, respectively.

In the light-shielded region (OB region) 3, since the color pixels are arranged, in relation to the adjacent rows, at the upper and lower ends of the image device 1 which are out of the scanned area, the scanned area may be extended in order to obtain the black level signals located in these parts.

Figure 3:
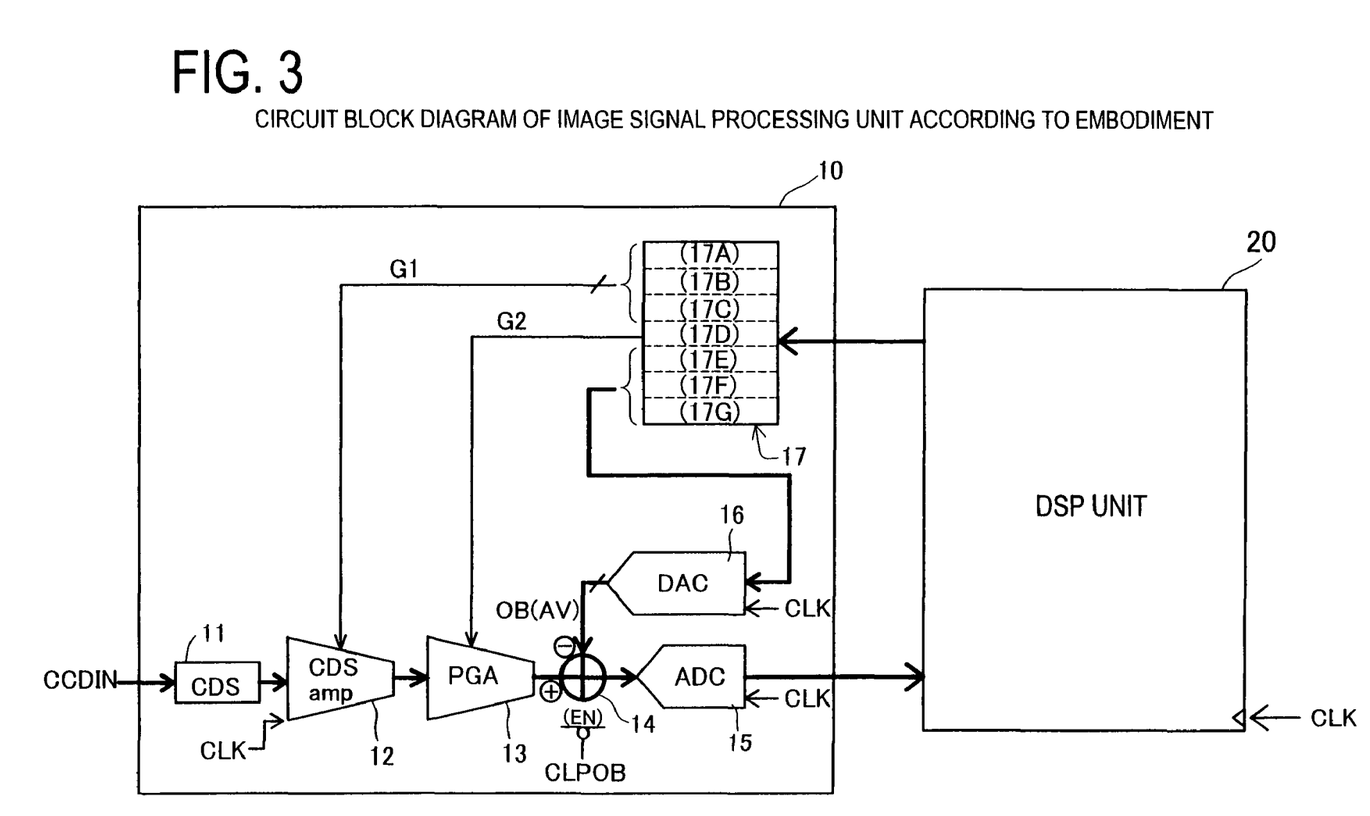
FIG. 3 is a circuit block diagram of an image signal processing unit according to an embodiment.

In FIG. 3 which shows the circuit block diagram of the embodiment, there are provided an image signal processing unit 10 and a DSP unit 20. The output signal CCDIN from the image device 1 (FIG. 1) is input to the image signal processing unit 10. The output signal CCDIN is an analog signal, and analog signal processing such as signal amplification is performed in the image signal processing unit 10. The signal which has undergone the analog signal processing is A/D-converted to be output as a digital signal to the DSP unit 20. In the DSP unit 20, image processing such as automatic adjustments of focus, exposure, etc. is performed. The image-processed pixel signal returns to the image signal processing unit 10 after being subjected to arithmetic processing if required. Thereby, appropriate analog processing conditions for the next output signal CCDIN from the image device 1 are set in the image signal processing unit 10.

In the image signal processing unit 10, a CDS circuit 11 to which the output signal CCDIN is input is connected to a first amplifier (CDSamp) 12 which is in turn connected to a second amplifier (PGA) 13. An adding terminal (+) of a computing unit 14 is connected to the second amplifier (PGA) 13 and its subtracting terminal (−) is connected to a D/A converter (DAC) 16. The output of the computing unit 14 is connected to an A/D converter (ADC) 15 and an A/D-converted color level signal is sent from the A/D converter (ADC) 15 to the DSP unit 20. Stored in a register unit 17 are various parameters which are calculated by the DSP unit 20 and required for the analog signal processing performed by the image signal processing unit 10.

The parameters stored in registers 17A to 17C are input to the first amplifier (CDSamp) 12. A first amplification factor G1 is stored which is used by the first amplifier (CDSamp) 12 for adjusting the sensitivities which differ between the color pixels R, G, B. The parameter stored in a register 17D is input to the second amplifier (PGA) 13. A second amplification factor G2 is stored which is used for expanding the color level signals effective as picture information up to the dynamic range of the A/D converter (ADC) 15. The parameters stored in registers 17E to 17G are input to the D/A converter (DAC) 16. In the computing unit 14, the black level signals OB of the light-shielded region (OB region) 3 for the color pixels are stored in order to respectively eliminate the black level signals OB from their associated pixel signals amplified by the first and second amplifiers 12, 13.

A timing signal CLK is input to the first amplifier (CDSamp) 12, the A/D converter (ADC) 15 and the D/A converter (DAC) 16. The timing signal CLK is a signal outputted whenever the pixel scanned is changed from one to another during scanning of the image device 1. An OB clamp signal CLPOB is input by negative logic to an enable terminal (EN) of the computing unit 14. The OB clamp signal CLPOB is a signal activated while the light shielded region (OB region) 3 of the image device 1 is scanned. Herein, the high-level state is regarded as an activated state.

Next, there will be explained the operation of the image signal processing unit 10 having the configuration described earlier. The output signal CCDIN from the image device 1 includes two types of signals. The CDS circuit 11 samples the output signal CCDIN with the timing of outputting each signal, thereby obtaining these signals. One of these signals is a reset level signal which is a reference signal sampled during a precharging period (Pre) (see FIG. 2). The other signal is a signal sampled in a pixel signal read-out period subsequent to the precharging period (Pre). A difference signal obtained by subtracting this signal from the reset level signal is the pixel signal. In the CDS circuit 11, the output signal CCDIN is sampled based on a timing signal (not shown) during the precharging period (Pre) and the pixel signal read-out period subsequent to it and the pixel signal, that is, the difference signal is released.

The pixel signals output from the CDS circuit 11 are signals in which the black level signals OBR, OBG or OBB are superimposed on the color level signal CR, CG or CB indicative of effective picture information. Generally, the sensitivities of the pixel signals differ between the color pixels R, G, B. The sensitivities of the red pixel R and blue pixel B are usually lower than that of the green pixel G. In the first amplifier (CDSamp) 12, a first amplification factor G1 is set for each of the color pixels R, G, B and the pixel signals are individually amplified with their respective amplification factors G1 in order to adjust the difference between the sensitivities of the color pixels R, G, B.

Figure 4:
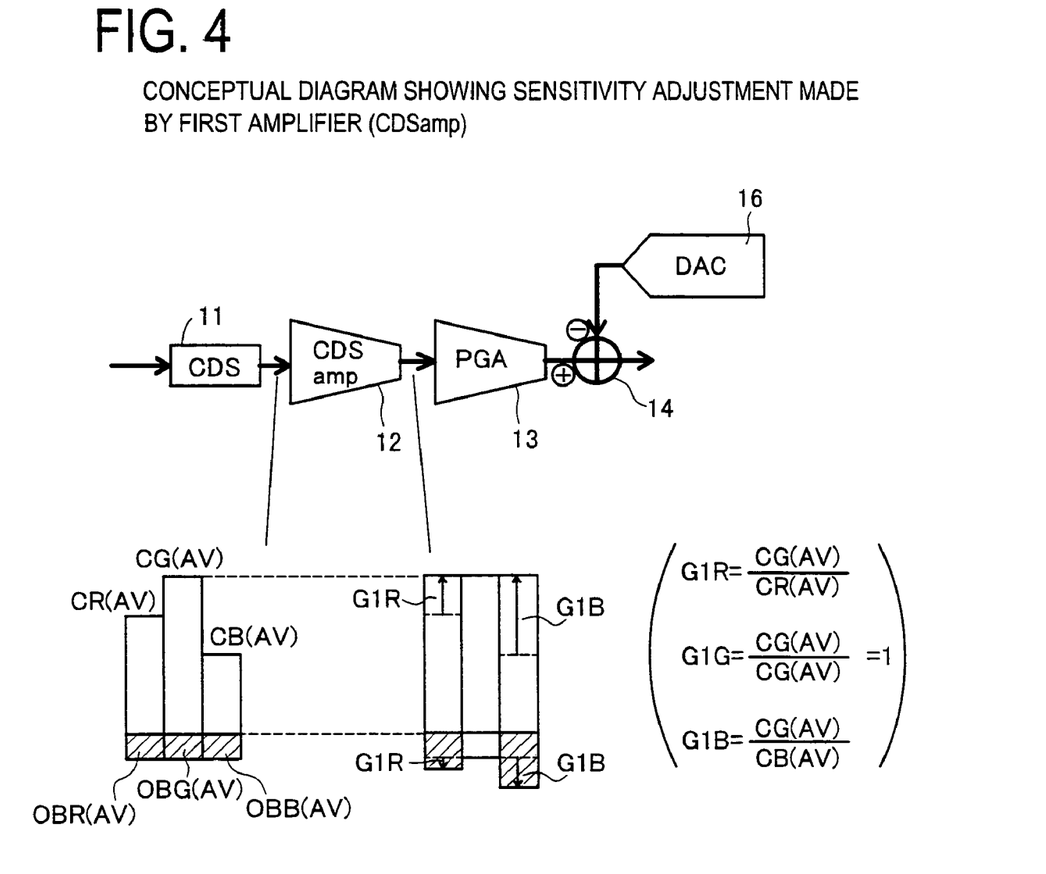
FIG. 4 is a conceptual diagram showing a sensitivity adjustment made by a first amplifier (CDSamp)

The process of this adjustment is shown in FIG. 4. FIG. 4 shows a case where the signal intensities of the pixel signals CR (AV)+OBR (AV), CG (AV)+OBG (AV), CB (AV)+OBB (AV) generated from the color pixels R, G, B which are diagrammatically shown as the output signals of the CDS circuit 11 are such average signal intensities that the signal intensities of the color level signals CR (AV), CG (AV), CB (AV) correspond to the sensitivities of the color pixels R, G, B.

To eliminate the difference in sensitivity between the color level signals CR (AV), CG (AV), CB (AV), the signal intensities of the color level signals CR (AV), CG (AV), CB (AV) are adjusted to the maximum signal intensity possessed by the color level signal CG (AV). More specifically, first amplification factors G1R, G1G, G1B are set for the color level signals CR (AV), CG (AV), CB (AV) respectively, these amplification factors having been calculated by the DSP unit 20 and stored in the registers 17A to 17C.

Herein, the amplification factor G1R for the red pixel R is calculated from G1R=CG(AV)/CR(AV). The amplification factor G1B for the blue pixel B is calculated from G1B=CG(AV)/CB(AV). The amplification factor G1G for the green pixel G is described by G1G=CG(AV)/CG(AV)=1. As described later with reference to FIG. 6, these amplification factors can be calculated beforehand through digital arithmetic processing performed by the DSP unit 20.

The registers 17A to 17C are sequentially selected in response to the timing signal CLK. Alternatively, if the first amplification factors G1R, G1G, G1B stored in the registers 17A to 17C have already been taken in the first amplifier (CDSamp) 12, the first amplification factors G1R, G1G, G1B are sequentially selected in the first amplifier (CDSamp) 12. Thereby, individual amplification is performed for every color pixel R, G, B and the first amplifier (CDSamp) 12 outputs signals obtained by adjusting the sensitivity deviation of each of the color pixels R, G, B. The color level signals CR (AV), CG (AV), CB (AV), which have average signal intensities corresponding to the sensitivities of the color pixels R, G, B respectively, are amplified. Concretely, the color level signal CR (AV) is amplified by the first amplification factor G1R and the color level signal CB (AV) is amplified by the first amplification factor G1B so that their signal intensities become equivalent to that of the color level signal CG (AV) It should be noted that the black level signals OBR (AV), OBG (AV), OBB (AV) are similarly amplified at the same time.

The pixel signals adjusted insensitivity are output from the first amplifier (CDSamp) 12 and input to the second amplifier (PGA) 13. In the second amplifier (PGA) 13, amplification is performed by use of the second amplification factor G2.

Figure 5:
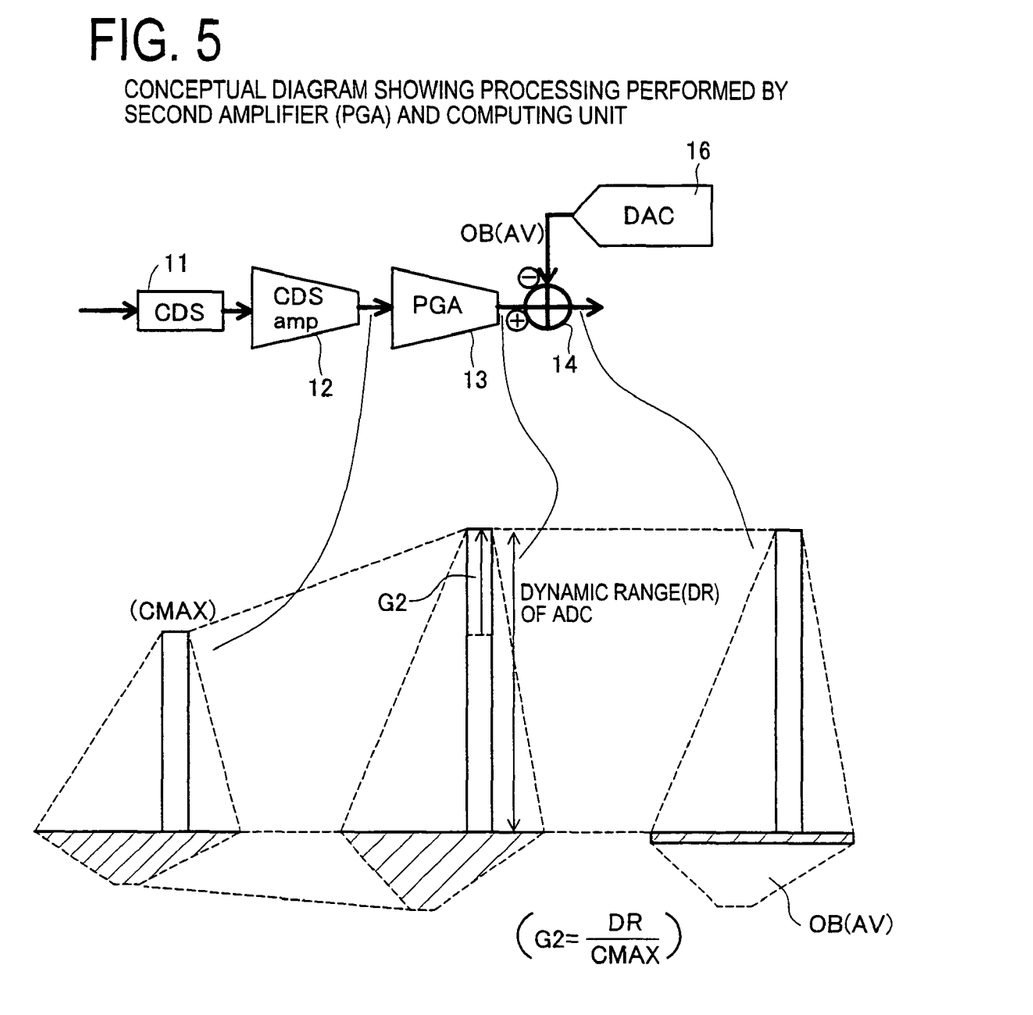
FIG. 5 is a conceptual diagram showing processing performed by a second amplifier (PGA) and a computing unit.

Herein, each of the pixel signals to be amplified by the first amplifier (CDSamp) 12 has a distribution of various signal intensities corresponding to picture information obtained from the effective pixel region 2 of the image device 1. FIG. 5 diagrammatically shows pixel signals which are obtained by amplifying such pixel signals of the color pixels R, G, B with the first amplification factors G1R, G1G, G1B respectively so that their sensitivities are adjusted. If a color level signal CMAX having the maximum signal intensity coincides with the dynamic range DR of the A/D converter (ADC) 15 located in the latter stage, all of the pixel signals adjusted in sensitivity will be effectively A/D-converted, making best use of the conversion ability of the A/D converter (ADC) 15.

In the second amplifier (PGA) 13, arithmetic processing is performed by the DSP unit 20 beforehand and the second amplification factor G2 stored in the register 17D is set as the amplification factor to be used. The second amplification factor G2 is calculated as the ratio of the dynamic range DR of the A/D converter (ADC) 15 to the color level signal CMAX having the maximum signal intensity, based on the color level signals obtained in the preceding image processing. In this case, the black level signals OB are amplified with the second amplification factor G2 at the same time.

Each pixel signal amplified by the second amplifier (PGA) 13 is such a signal that the color level signal component is amplified up to the dynamic range DR by the second amplification factor G2 and the black level signal component, which is also amplified with the second amplification factor G2, is superimposed on the color level signal. Therefore, the black level signal has to be subtracted from each pixel signal in order to A/D-convert the color level signal by the A/D converter (ADC) 15, making full use of the dynamic range. This subtraction is performed by the computing unit 14.

The black level signal to be subtracted in the computing unit 14 is the black level signals OBR, OBG and OBB which are respectively superimposed on the pixel signals output from the pixel device 1 and amplified by the first and second amplifiers 12, 13. Hereinafter, this black level signal to be subtracted is referred to as "the amplified black level signal". As described later in conjunction with FIG. 6, the amplified black level signal OB (AV) is obtained through the processing performed by the DSP unit 20 in which the black level signals OBR, OBG or OBB obtained from the light-shielded region (OB region) 3 are integrated and averaged as the black level signal which corresponds to the pixel signal of each color pixel R, G or B, by relating the pixels of the light-shield region (OB region) 3 to the pixel array of the effective pixel region 2. The arithmetic processing is performed beforehand and the amplified black level signals for the color pixels R, G, B are stored in the registers 17E to 17G respectively.

In response to the timing signal CLK, the registers 17E to 17G are sequentially selected so that each amplified black level signal OB (AV) is D/A-converted by the D/A converter (DAC) 16. The amplified black level signal OB (AV), which has been converted into an analog signal, is input to the computing unit 14 and subtracted from the associated pixel signal output from the second amplifier (PGA) 13, so that the color level signal expanded up to the dynamic range of the A/D converter (ADC) 15 is extracted and input to the A/D converter (ADC) 15.

Figure 6:
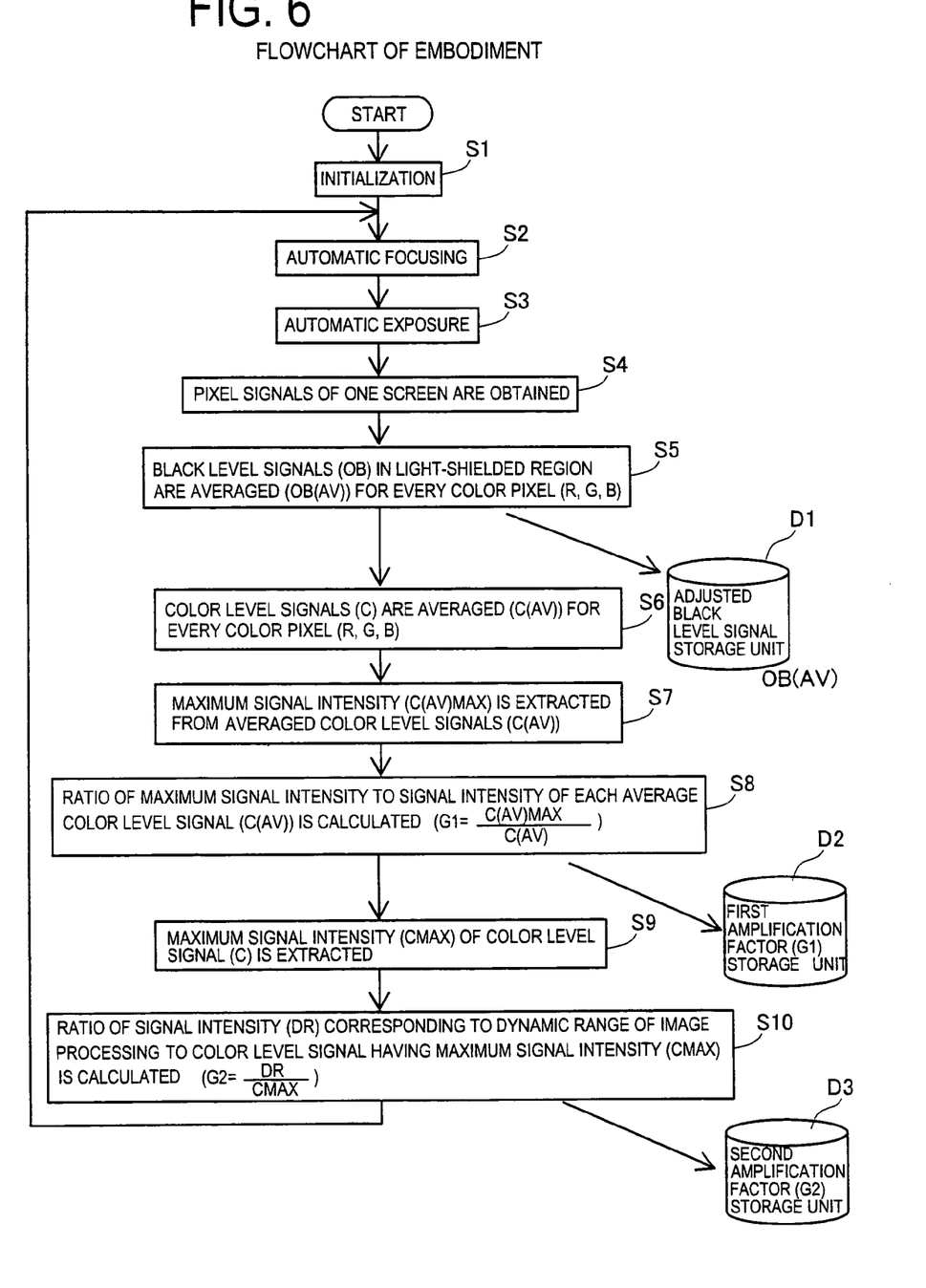
FIG. 6 is a flow chart of an image signal processing method according to the embodiment.

FIG. 6 shows a flow chart of the pixel signal processing method. After starting the processing, initialization is first performed (S1). The initialization defined herein includes: sensitivity adjustment for each color pixel R, G, B; amplification up to the dynamic range intended for the image processing performed in the latter stage; and setting of a black level component to be subtracted from each pixel signal. For instance, the initialization is performed such that the sensitivity adjustment and the amplification up to the dynamic range are not done (in this case, the amplification factors are 1) and the black level component to be subtracted from each pixel signal is made to be zero. More specifically, in the image signal processing unit 10 shown in FIG. 3, the initialization is performed such that all of the amplification factors G1, G2 stored in the registers 17A to 17D become 1 and the black level signal components stored in the registers 17E to 17G are made to be zero.

After picture information is fetched from the image device, automatic focusing (S2), automatic exposure (S3), etc. are carried out as the image processing and the pixel signals of one screen constituted by the effective pixel region 2 and the light-shielded region (OB region) 3 are obtained (S4).

Of the pixel signals which have been obtained, the black level signals OBR, OBG, OBB obtained from the light-shielded region (OB region) 3 are allocated to the color pixels R, G, B respectively in the order in which the color pixels are arranged in the rows of the effective pixel region 2 and then averaged. Thus, an average black level signal OB (AV) for each of the color pixels R, G, B is obtained (S5). The average black level signals OB (AV) are stored in an adjusted black level signal storage unit D1. More concretely, in the image signal processing unit 10 shown in FIG. 3, the average black level signals OB (AV) are stored in the registers 17E to 17G, respectively.

Then, the color level signals CR, CG, CB obtained by the image processing are averaged, thereby obtaining a color level signal C (AV) for each of the color pixels R, G, B (S6). A color level signal C (AV) MAX having the maximum signal intensity is extracted from the average color level signals C (AV) (S7). Then, the ratio of the maximum signal intensity to the signal intensity of the average color level signal C (AV) for each color pixel R, G, B is calculated (S8). The result of the arithmetic processing is the first amplification factor G1(=C (AV)MAX/C(AV)). The amplification factor G1 is calculated for every pixel R, G, B and stored in the first amplification factor (G1) storage unit D2. Specifically, in the image signal processing unit 10 shown in FIG. 3, the amplification factors G1 are stored in the registers 17A to 17C, respectively. It should be noted that Steps S7 to S8 correspond to the processing shown in FIG. 4.

The maximum signal intensity CMAX is extracted from the color level signals C (S9) and the ratio of the signal intensity DR corresponding to the dynamic range of the image processing to the maximum signal intensity CMAX is calculated (S10). The result of the arithmetic processing is the second amplification factor G2(=DR/CMAX) which is to be stored in a second amplification factor (G2) storage unit D3. Specifically, in the image signal processing unit 10 shown in FIG. 3, the second amplification factor G2 is stored in the register 17D. Steps S9 to S10 correspond to the processing shown in FIG. 5.

After the above step, the program returns to Step S2 to repeat the image processing. For the pixel signal to be subjected to the image processing, the black level signal OB (AV), the first amplification factor G1 and the second amplification factor G2, which have been obtained from the calculation in the preceding image processing, are utilized. Thereby, a sensitivity adjustment is made to each color pixel R, G, B and the signal intensity of each color level signal indicative of picture information is increased up to the dynamic range so that the image processing can be performed, making full use of the dynamic range.

The flow chart of FIG. 6 shows a flow of the image processing executed, for example, by the DSP unit 20 in the circuit block diagram of the embodiment shown in FIG. 3.

As fully discussed earlier, according to the image signal processing unit and image signal processing method of the present embodiment, the signal level can be increased up to the dynamic range DR of the image processing performed by the A/D converter (ADC) 15 and others, by amplifying the color level signals CR, CG, CB obtained by eliminating the black level signals OBR, OBG, OBB from the pixel signals. The conventional technique, in which signal intensity is increased by digital signal processing after A/D conversion, has not proved successful in fully utilizing the resolution of the A/D converter, because the signal intensity of the color level signals converted by the A/D converter does not reach the dynamic range of the A/D converter. In contrast with this, the present embodiment makes amplification that is analog signal processing, whereby the color level signal C can be increased up to a signal level which is high enough to make full use of the dynamic range of the A/D converter.

Prior to the conversion by the A/D converter (ADC) 15 and other image processing processes, the black level signals OBR, OBG, OBB, which are the noise components of the pixel signals, are eliminated at the stage of the analog signal processing. Only the color level signals CR, CG, CB, which are effective picture information, are amplified to a maximum extent and sent to the A/D converter (ADC) 15 and to other image processing devices. Thus, the picture information provided by the image device 1 can be processed by making full use of the dynamic range DR and the image processing by the DSP unit 20 and other image processing processes can be performed with the maximum resolution. As a result, the ability of the image device 1 can be utilized to the fullest possible extent.

The black level signals OBR, OBG, OBB to be eliminated from the pixel signals are calculated, using the pixel signals obtained from the light-shielded region (OB region) 3 of the image device 1. The pixel arrangement of the light-shielded region (OB region) 3 has the same continuity as that of the pixel array of the effective pixel region 2. Therefore, the black level signal OBR (OBG, OBB) corresponding to each of the color pixels R, G, B can be obtained by averaging the black level signals OBR (OBG, OBB) located at the pixel positions corresponding to the pixel array of the effective pixel region 2.

In the sensitivity adjustment made to every pixel R (G, B), the color level signal CR (CG, CB) may be taken out from the pixel signal and compared to the average signal intensity of the entire effective pixel region 2 to make an adjustment. This leads to an improvement in the accuracy of the sensitivity adjustment, compared to the technique disclosed in Japanese Published Unexamined Patent Application No. 2001-28716 according to which the SN ratio of each pixel signal is improved while the pixel signal contain the black level signal so that the black level signal, i.e., a noise component is inevitably amplified, resulting in poor accuracy in the sensitivity adjustment made to each of the color pixels R, G, B.

It is apparent that the invention is not necessarily limited to the particular embodiment shown herein and various changes and modifications are made to the disclosed embodiment without departing from the spirit and scope of the invention.

While the image device has been discussed taking a single-panel CCD for example in the foregoing embodiment, the invention is not limited to this. The invention is equally applicable to a so-called three-panel device configuration in which an image device is provided for each of the color pixels R, G, B.

According to the invention, the color level signal which is obtained by eliminating the black level signal from the pixel signal can be amplified up to the dynamic range. Since the black level signal, i.e., the noise component of the pixel signal is eliminated, the color level signal which provides effective picture information can be amplified up to a maximum extent. The picture information provided by the image device can be transmitted with the resolution corresponding to the upper limit of the dynamic range, so that the image processing at the later stage can be performed with the maximum resolution. In consequence, the ability of the image device can be utilized to the fullest possible extent.

What is claimed is:

1. An image signal processing unit for processing pixel signals provided by color pixels of an image device, each pixel signal including a color level signal and a black level signal superimposed on the color level signal, the processing unit comprising:
   a first amplifier to set a first amplification factor for the pixel signals for each color pixel to adjust the sensitivities of the color pixels;
   a second amplifier to amplify the pixel signals received from the first amplifier with a second amplification factor to increase a color level signal of the first adjusted pixel signals towards a maximum signal so as to have a signal intensity equivalent to a dynamic range of image processing performed in a latter stage;
   a computing unit to subtract a black level signal component, which is an analog signal, from each of the pixel signals, which are analog signals, amplified by the second amplifier and to output analog output signals;
   an A/D converter to convert the analog output signals into digital output Signals;
   a digital signal processor to process the digital output signals, and to determine a first value corresponding to the first amplification factor, a second value corresponding to the second amplification factor, and a third value corresponding to the black level signal;
   a D/A converter coupled to the computing unit; and
   a plurality of registers to store the first value, the second value, and the third value based on the digital signal processor, and to supply the first value to the first amplifier, to supply the second value to the second amplifier, and to supply the third value to the D/A converter,
   wherein the D/A converter converts the third value into the black level signal, and supplies the black level signal to the computing unit.

2. The image signal processing unit according to claim 1, wherein the dynamic range of image processing performed in the latter stage is the dynamic range of the A/D converter.

3. The image signal processing unit according to claim 1, wherein the first amplification factor, the second amplification factor and the black level signal component are determined based on a result of preceding image processing previously performed.

4. The image signal processing unit according to claim 3, wherein the image processing is digital arithmetic processing, and
   wherein the first amplifier sets, in the preceding image processing, the first amplification factor for each color pixel according to the ratio of a maximum signal intensity to a signal intensity of each color pixel,
   the maximum signal intensity being the highest in the signal intensities of the average color level signals of the color pixels,
   the signal intensity of each color pixel being the signal intensity of the average color level signal of each color pixel.

5. The image signal processing unit according to claim 3, wherein the image processing is digital arithmetic processing, and
   wherein the second amplifier sets, in the preceding image processing, the second amplification factor according to the ratio of a signal intensity equivalent to the dynamic range to the maximum signal intensity which is the highest in the signal intensities of the color level signals.

6. The image signal processing unit according to claim 3, wherein the image processing is digital arithmetic processing, and
   wherein the computing unit performs, in the preceding image processing, subtraction operation according to an average black level signal obtained by averaging the black level signals for each color pixel, the black level signals being provided by a light-shielded region of the image device.

7. The image signal processing unit according to claim 6, wherein the light-shielded region is located in the periphery of an effective pixel region, and
   wherein the black level signals corresponding to the order of the light-shielded region are allocated to the color pixels, according to the order of the color pixels arranged in the effective pixel region.

8. The image signal processing unit according to claim 1, wherein the black level signal component subtracted by the computing unit is obtained by amplifying the black level signals by the first amplifier and the second amplifier.

9. An image signal processing method for processing pixel signals provided by color pixels of an image device, each pixel signal composed of a color level signal and a black level signal superimposed on the color level signal, the method comprising:
storing a first value, a second value and a third value, which are determined through digital signal processing, in a plurality of registers;
adjusting sensitivities between the color pixels by individually amplifying the pixel signal of each color pixel to obtain adjusted pixel signals based on the first value stored in the plurality of registers;
amplifying the adjusted pixel signals so that the color level signals of the pixel signals are increased up to a dynamic range of image processing performed in a latter stage so as to obtain amplified pixel signals based on the second value stored in the plurality of registers;
D/A-converting the third value stored in the plurality of registers into a black level signal;
subtracting the black level signal component, which is an analog signal, from each of the amplified pixel signals, which are analog signals, to obtain analog difference signals; and
A/D-converting the analog difference signals into digital signals,
wherein the digital signal processing is applied to the digital signals converted at the A/D-converting.

10. The image signal processing method according to claim 9,
wherein the dynamic range of image processing performed in the latter stage is the dynamic range of the pixel signals which have been A/D-converted.

11. The image signal processing method according to claim 9,
wherein the image processing is digital arithmetic processing, and
the method further comprises:
averaging the signal intensities of the color level signals for each color pixel; and
calculating each ratio of a maximum signal intensity to a signal intensity of each color pixel as each first amplification factor for the pixel signals for each color pixel,
the maximum signal intensity being the highest in the signal intensities of the average color level signals of the color pixels,
the signal intensity of each color pixel being the signal intensity of the average color level signal of each color pixel,
the averaging and the calculating being performed based on the result of preceding image processing previously performed, prior to the adjusting.

12. The image signal processing method according to claim 9,
wherein the image processing is digital arithmetic processing, and
the method further comprises:
calculating, as a second amplification factor to be applied to the adjusted pixel signals, the ratio of a signal intensity equivalent to the dynamic range of a maximum signal intensity which is the highest in the signal intensities of the color level signals, based on the result of preceding image processing previously performed, prior to the amplifying the adjusted pixel signals adjusted.

13. The image signal processing method according to claim 9,
wherein the image processing is digital arithmetic processing, and
the method further comprises:
calculating the black level signal component for each color pixel by averaging the black level signals for each color pixel which are provided by the light-shielded region of the image device, based on the result of preceding image processing previously performed, prior to the subtracting the black level signal component.

14. The image signal processing method according to claim 13,
wherein the black level signals corresponding to the order of the light-shielded region are allocated to the color pixels, according to the order of the color pixels arranged in an effective pixel region.

15. The image signal processing method according to claim 9,
wherein the black level signal component subtracted from each pixel signal is obtained by the amplification of the black level signals in the sensitivity adjusting step and in the step of amplifying the pixel signals adjusted in sensitivity.

* * * * *